United States Patent
Hayakawa et al.

(10) Patent No.: US 10,410,762 B2
(45) Date of Patent: Sep. 10, 2019

(54) CABLE AND WIRE HARNESS

(71) Applicant: Hitachi Metals, Ltd., Tokyo (JP)

(72) Inventors: Yoshikazu Hayakawa, Tokyo (JP); Tomoyuki Murayama, Tokyo (JP); Hirotaka Eshima, Tokyo (JP); Fumihito Oka, Tokyo (JP); Takahiro Futatsumori, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/829,079

(22) Filed: Dec. 1, 2017

(65) Prior Publication Data

US 2018/0166184 A1 Jun. 14, 2018

(30) Foreign Application Priority Data

Dec. 9, 2016 (JP) ................. 2016-239154

(51) Int. Cl.
*H01B 7/00* (2006.01)
*H01B 7/18* (2006.01)
(Continued)

(52) U.S. Cl.
CPC ......... *H01B 7/1855* (2013.01); *H01B 7/0045* (2013.01); *H01B 7/187* (2013.01);
(Continued)

(58) Field of Classification Search
USPC ........ 174/110 R, 113 R, 115, 120 R–121 AR
See application file for complete search history.

(56) References Cited

U.S. PATENT DOCUMENTS 4,150,249 A * 4/1979 Pedersen ................. H01B 7/295
174/36
4,238,638 A * 12/1980 Cretney ................. H01B 7/285
174/23 C
(Continued)

FOREIGN PATENT DOCUMENTS

JP S53153489 U 12/1978
JP S57197109 U 12/1982
(Continued)

OTHER PUBLICATIONS

Japanese Office Action issued in corresponding Japanese Application No. 2016-239154 dated Sep. 7, 2018.
(Continued)

*Primary Examiner* — William H. Mayo, III
(74) *Attorney, Agent, or Firm* — Roberts Mlotkowski Safran Cole & Calderon P.C.

(57) ABSTRACT

A cable includes an assembled article formed by twisting a plurality of electric wires, a tape member spirally wound around the assembled article, and a sheath covering around the tape member. The sheath includes an injection molded body including an urethane resin. The tape member includes a non-woven fabric tape including a polyester, a polypropylene, an aramid fiber, a nylon, an acryl fiber, or a glass fiber and an air permeability defined by the Frazier method of not less than 30 $cm^3/cm^2 \cdot sec$. A twist direction of the assembled article is opposite to a winding direction of the non-woven fabric tape.

11 Claims, 3 Drawing Sheets

(51) Int. Cl.
*H01B 7/295* (2006.01)
*H01B 11/02* (2006.01)
*H01B 7/285* (2006.01)
*B60T 13/74* (2006.01)
*B60R 16/02* (2006.01)
*H01B 7/04* (2006.01)
*H01B 13/02* (2006.01)

(52) U.S. Cl.
CPC ............ *H01B 7/285* (2013.01); *H01B 7/295* (2013.01); *H01B 11/02* (2013.01); *B60R 16/0207* (2013.01); *B60T 13/74* (2013.01); *H01B 7/04* (2013.01); *H01B 13/02* (2013.01); *H01R 2201/26* (2013.01); *Y02A 30/14* (2018.01)

(56) References Cited

U.S. PATENT DOCUMENTS

| | | | | |
|---|---|---|---|---|
| 4,547,626 A | * | 10/1985 | Pedersen | G02B 6/4416 174/107 |
| 6,462,268 B1 | * | 10/2002 | Hazy | H01B 7/1895 174/113 R |
| 6,479,143 B1 | * | 11/2002 | Tamaru | D01F 6/12 428/364 |
| 7,939,764 B2 | * | 5/2011 | Gottfried | H01B 3/443 174/110 R |
| 2005/0150593 A1 | * | 7/2005 | Honma | B32B 5/08 156/245 |
| 2006/0021786 A1 | * | 2/2006 | Fetterolf, Sr. | H01B 9/003 174/113 R |
| 2014/0326480 A1 | * | 11/2014 | Hashimoto | H01B 7/295 174/113 R |
| 2016/0141070 A1 | | 5/2016 | Heipel et al. | |
| 2016/0145782 A1 | * | 5/2016 | Sasaki | D04H 3/16 428/332 |
| 2017/0264062 A1 | | 9/2017 | Hayakawa et al. | |
| 2017/0264063 A1 | | 9/2017 | Hayakawa et al. | |
| 2017/0323702 A1 | | 11/2017 | Heipel et al. | |

FOREIGN PATENT DOCUMENTS

| | | | | |
|---|---|---|---|---|
| JP | 2014-220043 A | * | 11/2014 | ............ H01B 7/00 |
| JP | 6943170 B1 | | 6/2016 | |
| JP | 6943171 B1 | | 6/2016 | |
| WO | 2015090658 A1 | | 6/2015 | |

OTHER PUBLICATIONS

Office Action issued in corresponding Japanese Application No. 2016-239154 dated Nov. 16, 2018.

\* cited by examiner

CABLE AND WIRE HARNESS

The present application is based on Japanese patent application 2016-239154 filed on Dec. 9, 2016, the entire contents of which are incorporated herein by reference.

BACKGROUND OF THE INVENTION

1. Field of the Invention

This invention relates to a cable and a wire harness using the cable.

2. Description of the Related Art

A cable is known in which a sheath is provided around plural electric wires. The cable is fabricated such that a lubricant such as talc powder is coated around the electric wires so as to easily expose the electric wires from the sheath. However, in processing the terminal, the lubricant scattered around the cable may lower the work efficiency.

As a solution therefor, a cable has been proposed in which a tape member is spirally wound around plural electric wires and a sheath is arranged around the tape member (see e.g. JP 2014/220043A, JP 5943170B1, and JP 5943171B1).

By arranging the tape member around the electric wires, the electric wires can be easily exposed from the sheath without coating the lubricant on the electric wires.

SUMMARY OF THE INVENTION

The inventors found the problem that voids may occur in the sheath when arranging the sheath of urethane resin around the tape member.

The inventors analyzed the problem and then found the next two reasons for the voids occurred in the sheath.
(1) Where the tape member absorbs moisture in the air and then the sheath of urethane resin covers the tape member absorbing the moisture upon injection molding, bubbles may occur in the sheath to cause the voids due to the moisture absorbed in the tape member and then evaporated by heat during the molding.
(2) Where the air including moisture remains in a gap inside the tape member (i.e., a gap remaining between the plural electric wires) and the air remaining in the gap is then released through a gap in the tape member or an overlapped portion of the tape member by the heat during the molding, the bubbles may occur in the sheath due to the released air.

It is an object to provide a cable that prevents the occurrence of void in the sheath of an urethane resin, as well as a harness using the cable.

According to an embodiment of the invention, a cable comprises:
an assembled article formed by twisting a plurality of electric wires;
a tape member spirally wound around the assembled article; and
a sheath covering around the tape member, the sheath comprising an injection molded body comprising an urethane resin,
wherein the tape member comprises a non-woven fabric tape comprising a polyester, a polypropylene, an aramid fiber, a nylon, an acryl fiber, or a glass fiber and an air permeability defined by the Frazier method of not less than 30 cm$^3$/cm$^2$·sec, and wherein a twist direction of the assembled article is opposite to a winding direction of the non-woven fabric tape.

According to another embodiment of the invention, a wire harness comprises:
the cable defined above; and
a connector arranged at an end of the electric wire.

Effects of the Invention

According to an embodiment of the invention, a cable can be provided that prevents the occurrence of void in the sheath of an urethane resin, as well as a harness using the cable.

BRIEF DESCRIPTION OF THE DRAWINGS

Next, the present invention will be explained in conjunction with appended drawings, wherein.

DETAILED DESCRIPTION OF THE PREFERRED EMBODIMENTS

Embodiments

The embodiment in the invention will be described below in conjunction with the appended drawings.

(Description of a Vehicle for which a Cable of the Invention is Used)

Figure 1:
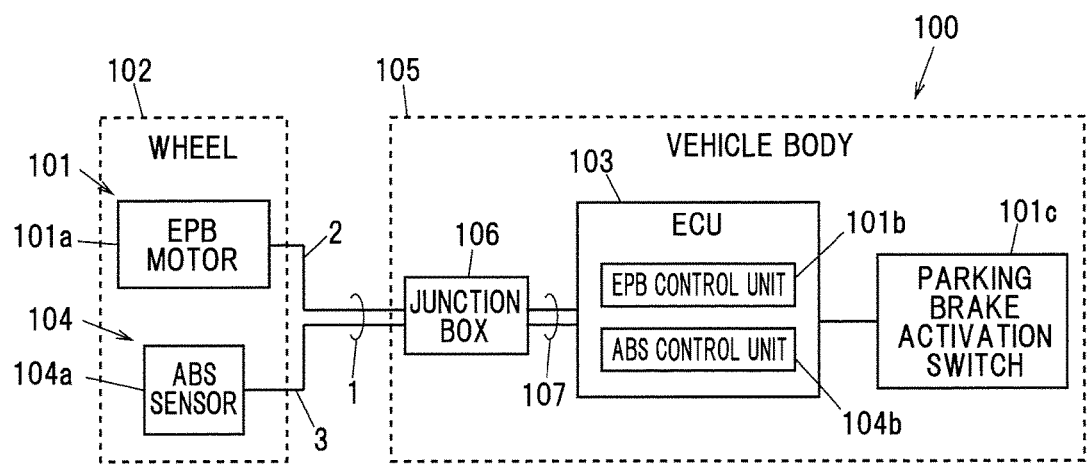
FIG. 1 is a block diagram showing a configuration of a vehicle for which a cable in an embodiment of the invention is used.

FIG. 1 is a block diagram showing a configuration of the vehicle for which a cable in an embodiment of the invention is used.

As shown in FIG. 1, a vehicle 100 is provided with an electric parking brake (hereinafter, referred to as "EPB") 101 as an electrically operated brake unit.

The EPB 101 is provided with an EPB motor 101a and an EPB control unit 101b.

The EPB motor 101a is a wheel-side device mounted on a wheel 102 of the vehicle 100. The EPB control unit 101b is mounted on an ECU (electronic control unit) 103 that is a vehicle body-side device of the vehicle 100. Meanwhile, the control unit 101b may be mounted on a control unit besides the ECU 103, or may be mounted on a dedicated hardware unit.

As not shown, the EPB motor 101a is provided with a piston to which brake pads are attached, and it is configured so as to generate a braking force by moving the piston by rotary drive of the EPB motor 101a and press the brake pads against a disc rotor of a wheel (the wheel 102). A pair of first electric wires 2 as power lines is connected to the EPB motor 101a to supply a drive current to the EPB motor 101a.

The EPB control unit 101b is configured such that the brake pads are pressed against the disc rotor of the wheel 102 and the braking force is generated so as to be applied to the wheel 102 by outputting the drive current to the EPB motor 101a for a predetermined period of time (e.g., for 1 second) when a parking brake activation switch 101c is turned on after the vehicle 100 stops. The EPB control unit 101b is also configured such that the brake pads move away from the disc rotor of the wheel and the braking force on the wheel 102 is released by outputting the drive current to the EPB motor 101a when the parking brake activation switch 101c is turned off or when an accelerator pedal is depressed. In other words, it is configured such that an operating state of the EPB 101 is maintained from when the parking brake activation switch 101c is turned on to when the parking brake activation switch 101c is turned off or the accelerator pedal is depressed. The parking brake activation switch 101c may be a switch of either a lever-type or pedal-type.

An ABS device 104 is also mounted on the vehicle 100. The ABS device 104 is provided with an ABS sensor 104a and an ABS control unit 104b.

The ABS sensor 104a is a rotation speed detection sensor mounted on the wheel 102, which detects a rotation speed of the wheel 102 while the vehicle runs. The ABS control unit 104b is mounted on the ECU 103, which controls a brake unit based on an output of the ABS sensor 104a to adjust the braking force applied to the wheel 102 so that the wheel 102 is not locked when suddenly stopped. A pair of second electric wires 3 as signal lines is connected to the ABS sensor 104a.

Figure 2A:
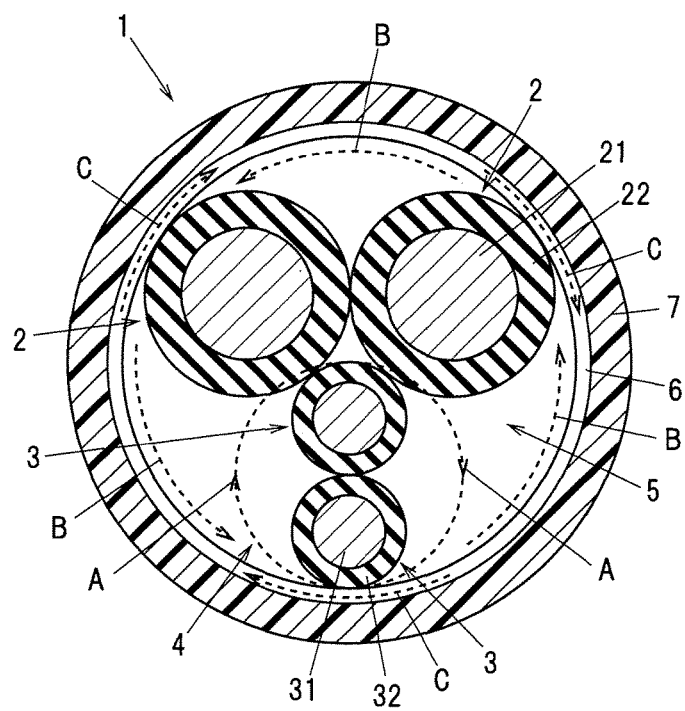
FIG. 2A is a cross sectional view showing the cable in the embodiment of the invention.
Figure 2B:
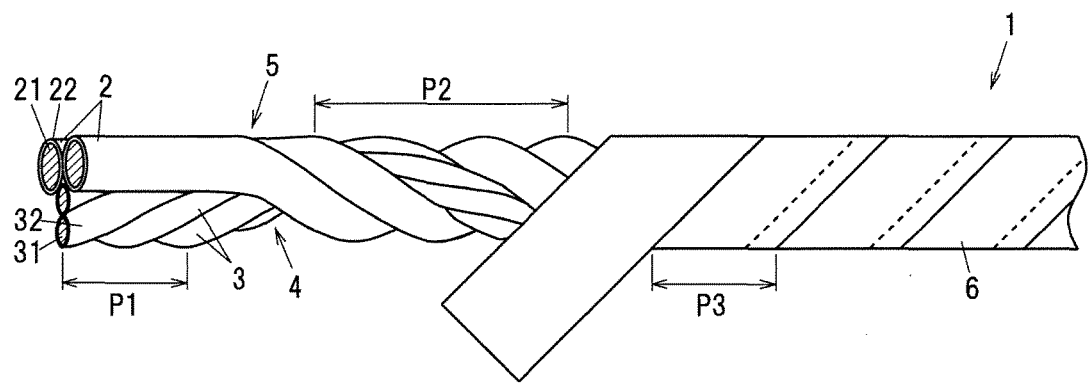
FIG. 2B is an explanatory diagram showing twist directions of first electric wires and second electric wires and an winding direction of a non-woven fabric tape in the cable shown in FIG. 2A.

A cable 1 in the embodiment is obtained by covering all the first electric wires 2 and the second electric wires 3 with a sheath 7 (see FIGS. 2A, 2B). The cable 1 extended from the wheel 102 side is connected to a wire group 107 inside a junction box 106 provided on a vehicle body 105 and is then connected to the ECU 103 and a battery (not shown) via the wire group 107.

Although only one wheel 102 is shown in FIG. 1 to simplify the drawing, the EPB motor 101a and the ABS sensor 104a may be mounted on each of the wheels 102 of the vehicle 100, or may be mounted on, e.g., only front wheels or only rear wheels of the vehicle 100.

(Description of Cable 1)

FIG. 2A is a cross sectional view showing the cable 1 in the embodiment. FIG. 2B is an explanatory diagram showing twist directions of first electric wires and second electric wires, and an winding direction of a non-woven fabric tape 6.

As shown in FIGS. 2A, 2B, the cable 1 is provided with an assembled article 5 formed by twisting a plurality of the electric wires (a pair of the first electric wires 2 and a twisted pair wires 4 in the embodiment), a non-woven fabric tape 6 spirally wound around the assembled article 5, which is formed of polyester, polypropylene, aramid fiber, nylon, acryl fiber, or glass fiber, and the sheath 7 covering around the non-woven fabric tape 6, which is an injection molded body formed of urethane resin.

In the embodiment, the first electric wire 2 is provided with a power line for supplying the drive current to the motor 101a for the EPB 101 mounted on the wheel 102 of the vehicle 100. The second electric wire 3 configuring the twisted pair wire 4 is provided with a signal line for the ABS sensor 104a mounted on the wheel 102.

The first electric wire 2 is configured such that a first conductor 21 formed by twisting highly conductive strands of copper, and copper alloy etc., is covered with a first insulation 22 formed of an insulating resin such as cross-linked polyethylene.

Strands having a diameter of not less than 0.05 mm and not more than 0.30 mm can be used to form the first conductor 21. When using strands having a diameter of less than 0.05 mm, sufficient mechanical strength may not be obtained, and bending resistance may decrease. When using strands having a diameter of more than 0.30 mm, flexibility of the cable 1 may decrease.

The outer diameter of the first conductor 21 and the thickness of the insulation 22 of the first electric wire 2 are appropriately adjusted according to magnitude of required drive current. In the embodiment, considering that the first electric wire 2 is the power line for supplying the drive current to the motor 101a for the EPB 101, the outer diameter of the first conductor 21 is set to not less than 1.5 mm and not more than 3.0 mm, and the outer diameter of the first electric wire 2 is set to not less than 2.0 mm and not more than 4.0 mm.

The second electric wire 3 is configured such that a second conductor 31 formed by twisting highly conductive strands of copper, or copper alloy etc., is covered with a second insulation 32 formed of the insulating resin such as cross-linked polyethylene. Strands having a diameter of not less than 0.05 mm and not more than 0.30 mm can be used to form the second conductor 31, in the same manner as the first conductor 21.

The outer diameter of the second electric wire 3 is smaller than that of the first electric wire 2. In the embodiment, the twisted pair wire 4 formed by twisting a pair (two) of second electric wires 3 is twisted with the pair of first electric wires 2. Therefore, from the viewpoint of making the outer diameter of the cable 1 close to a circular shape, it is desirable to use the second electric wire 3 which is approximately half the outer diameter of the first electric wire 2. In detail, it is possible to use the second electric wire 3 which has an outer diameter of not less than 1.0 mm and not more than 1.8 mm and is formed by using the second conductor 31 having an outer diameter of not less than 0.4 mm and not more than 1.0 mm.

A twist pitch P1 of the twisted pair wire 4 may be set so that an unnecessary load is not applied to the second electric wires 3 by taking into account the outer diameter of the second electric wire 3. Although the twist pitch P1 of the twisted pair wire 4 here is approximately 30 mm, the twist pitch P1 of the twisted pair wire 4 is not limited thereto. Meanwhile, the twist pitch P1 of the twisted pair wire 4 is a distance along a longitudinal direction of the twisted pair wire 4 at which a given second electric wire 3 is located at the same position in a circumferential direction of the twisted pair wire 4.

The assembled article 5 is formed by twisting the pair of first electric wires 2 and the twisted pair wire 4 together. In the embodiment, the assembled article 5 is configured so that the pair of first electric wires 2 are in contact with each other, the pair of second electric wires 3 are in contact with each other, and the pair of first electric wires 2 are further in contact with the second electric wires 3. In this configuration, the second electric wires 3 are at least partially arranged in a triangle boundary area between the pair of first electric wires 2.

Furthermore, in the embodiment, the assembled article 5 is formed by plurally arranging thread-like (fibrous) filler materials (not shown) extending in the longitudinal direction of the cable 1 between the pair of first electric wires 2/the twisted pair wire 4 and the non-woven fabric tape 6, and twisting together with the first electric wires 2 and the twisted pair wire 4. Thus, the twist direction and twist pitch of the plural filler materials are the same as those of the assembled article 5. The plural filler materials are arranged to fill a gap between the pair of first electric wires 2/the twisted pair wire 4 and the non-woven fabric tape 6, so that a cross sectional shape after winding the non-woven fabric tape 6 around the assembled article 5 is closer to a circle.

Some of the plural filler materials may be arranged in a triangle boundary area between the pair of first electric wires 2 and a triangle boundary area between the pair of second electric wires 3.

As the filler material, it is possible to use a fibrous material such as polypropylene yarn, spun rayon yarn (rayon staple fiber), aramid fiber, nylon fiber or fiber plastic, a paper or a cotton yarn. In addition, the cross sectional area of the filler materials on the cross section shown in FIG. 2 is desirably smaller than both the cross sectional areas of the first electric wires 2 and the cross sectional area of the second electric wires 3.

In the EPB 101, the drive current is supplied to the motor 101*a* basically after the vehicle stops. Meanwhile, the ABS sensor 104*a* is used when the vehicle runs, and the ABS sensor 104*a* is hardly used during when the drive current is supplied through the first electric wires 2 in normal use. Therefore, in the embodiment, a shield conductor around the twisted pair wire 4 is omitted. Omitting the shield conductor allows the cable 1 to have a smaller diameter than a cable providing the shield conductor and also reduces the number of components, thereby reducing the cost.

Although the first electric wire 2 for supplying the drive current to the EPB motor 101*a* is described here, for example, the first electric wire 2 may be used to supply the drive current to an electric motor of an electro-mechanical brake (hereinafter, referred as EMB) provided on the wheel 102. In this case, since electric current flows through the first electric wires 2 also while the vehicle 100 runs, it is desirable to provide a shield conductor around the twisted pair wire 4 to prevent malfunction of the ABS device 104 due to noise.

Meanwhile, although the second electric wire 3 as a signal line for the ABS sensor 104*a* is described here, the second electric wire 3 may be a signal line used for another sensor provided on the wheel 102 such as a temperature sensor or an air pressure sensor for detecting air pressure of a tire, etc., or may be a damper wire used to control a damping device of the vehicle 100, or moreover, may be a signal line for controlling the EMB (such as a CAN cable). Even when the first electric wire 2 is used to supply the drive current to the EPB motor 101*a*, it is desirable to provide a shield conductor around the twisted pair wire 4 in case of using the second electric wires 3 while the vehicle 100 is stopped to prevent malfunction due to noise.

The outer diameter of the entire assembled article 5 is, e.g., approximately 5 mm to 9 mm. A twist pitch P2 of the assembled article 5 may be set so that an unnecessary load is not applied to the first electric wires 2 and the twisted pair wire 4 by taking into account the outer diameter of the assembled article 5. Although the twist pitch P2 of the assembled article 5 here is approximately 60 mm, the twist pitch P2 of the assembled article 5 is not limited thereto. The twist pitch P2 of the assembled article 5 is a distance along a longitudinal direction of the assembled article 5 at which a given first electric wire 2 or the twisted pair wire 4 is located at the same position in a circumferential direction of the assembled article 5.

The non-woven fabric tape 6 is spirally wound around the assembled article 5, and the non-woven fabric tape 6 is in contact with all electric wires configuring the assembled article 5 (the pair of first electric wires 2 and the twisted pair wire 4) in the embodiment. The non-woven fabric tape 6 is interposed between the assembled article 5 and the sheath 7 and serves to reduce friction between the assembled article 5 (the electric wires 2, 3) and the sheath 7 when being bent. In other words, providing the non-woven fabric tape 6 can reduce friction between the electric wires 2, 3 and the sheath 7 without using a lubricant such as talc powder unlike a known cable, and thus reduces stress applied to the electric wires 2, 3 when being bent, and it is thereby possible to improve bending resistance.

The non-woven fabric tape 6 is desirably slidable (desirably has a low friction coefficient) with respect to the first insulation 22 of the first electric wire 2 and the second insulation 32 of the second electric wire 3. In more detail, a material of the non-woven fabric tape 6 may be selected so that the friction coefficient (coefficient of static friction) between the non-woven fabric tape 6 and the insulations 22, 32 is lower than the friction coefficient (coefficient of static friction) between the sheath 7 and the insulations 22, 32 without the non-woven fabric tape 6.

The non-woven fabric tape 6 is spirally wound around the assembled article 5 so as to overlap at a portion in a width direction (a direction perpendicular to the longitudinal direction and thickness direction of the tape member 3). The overlap width of the non-woven fabric tape 6 is, e.g., not less than ¼ and not more than ½ of the width of the non-woven fabric tape 6. Meanwhile, an overlapped portion of the non-woven fabric tape 6 is not adhered by adhesion etc.

The width of the non-woven fabric tape 6 may be determined so that creases are not formed on the non-woven fabric tape 6 when the non-woven fabric tape 6 is wound, and it is desirable that the width of the non-woven fabric tape 6 decreases according as the outer diameter of the entire assembled article 5 decreases. In detail, when the outer diameter of the entire assembled article 5 is not less than 5 mm and not more than 9 mm, the width of the non-woven fabric tape 6 may be approximately not less than 20 mm and not more than 50 mm.

An winding pitch of the non-woven fabric tape 6, i.e., a distance along a longitudinal direction at which the non-woven fabric tape 6 is located at the same circumferential position (e.g., a distance between the widthwise edges) can be adjusted by the width of the non-woven fabric tape 6 and the overlap width. If the width of the non-woven fabric tape 6 is increased and the winding pitch is also increased, the non-woven fabric tape 6 becomes close to the longitudinally wrapped state, resulting in that the composite cable 1 has less flexibility and is less likely to be bent. Therefore, the winding pitch of the non-woven fabric tape 6 is desirably not more than 50 mm.

The sheath 7 formed of urethane resin is provided around the non-woven fabric tape 6 while contacting with the sheath 7. The sheath 7 is an injection molded body formed by injection molding. Although a shield conductor is omitted in the embodiment since the first electric wires 2 are used to supply the drive current to the EPB motor 101*a* and the drive current flows through the first electric wires 2 in a relatively short time, a shield conductor may be provided between the non-woven fabric tape 6 and the sheath 7 or around the sheath 7 depending on the intended use, etc., of the first electric wires 2.

In the cable 1 of the embodiment, the non-woven fabric tape 6 is formed of non-woven fabric such as polyester, polypropylene, aramid fiber, nylon, acryl fiber, or glass fiber.

Since the non-woven fabric tape 6 is formed of polyester, polypropylene, aramid fiber, nylon, acryl fiber, or glass fiber, the non-woven fabric tape 6 is hard to absorb moisture. Thus, the non-woven fabric tape 6 can prevent evaporating moisture and causing bubbles in the sheath 7 by heating the sheath 7 in covering.

In the embodiment, air permeability in the non-woven fabric tape 6 defined by the Frazier method is not less than 30 $cm^3/cm^2 \cdot sec$. Bubbles may be caused in the sheath 7 since air including moisture is easy to be stored in a space surrounded by the non-woven fabric tape 6 (a space housing the assembled article 5) and the stored air is released from a gap between the non-woven fabric tape 6 or the overlapped portion of the non-woven fabric tapes 6 by heating the sheath 7 in covering as the air permeability is less than 30 $cm^3/cm^2 \cdot sec$. Defining the air permeability by the Frazier method can be processed by a method based on JIS L1913.

Meanwhile, the air permeability of the non-woven fabric tape 6 is desirably not more than 200 $cm^3/cm^2 \cdot sec$. Work efficiency in a terminal process may decrease since a part of the sheath 7 passes through the non-woven fabric tape 6 and reach for the electric wire 2 in covering the non-woven fabric tape 6 with the sheath 7 and the sheath 7 is fused with the first electric wire 2 and/or the second electric wire 3 as the air permeability is more than 200 $cm^3/cm^2 \cdot sec$.

Thus, the air permeability of the non-woven fabric tape 6 may be not less than 30 $cm^3/cm^2 \cdot sec$ and not more than 200 $cm^3/cm^2 \cdot sec$. The air permeability is further desirably not less than 40 $cm^3/cm^2 \cdot sec$ and not more than 100 $cm^3/cm^2 \cdot sec$ so as to further prevent causing the bubbles in the sheath 7 caused by air stored in the space surrounded by the non-woven fabric tape 6 and fusing the electric wire 2 and the sheath 7.

Meanwhile, the thickness of the non-woven fabric tape 6 is desirably not less than 0.03 mm and not more than 0.10 nm. Work efficiency in the terminal process may decrease since the part of the sheath 7 passes through the non-woven fabric tape 6 and reach for the first electric wire 2 and/or the second electric wire 3 in covering the non-woven fabric tape 6 with the sheath 7 as the thickness of the non-woven fabric tape 6 is less than 0.03 mm. Also, stiffness of the non-woven fabric tape 6 increases and the flexibility in the cable 1 may decrease as the thickness of the non-woven fabric tape 6 is more than 0.10 mm. Moreover, the air permeability also may decrease.

In the embodiment, the non-woven fabric tape 6 formed of polyether having the air permeability of 67 $cm^3/cm^2 \cdot sec$, whose thickness is 0.07 mm is used.

(Twist Directions of Twisted Pair Wire 4 and Assembled Article 5, and Winding Direction of Non-Woven Fabric Tape 6)

The cable 1 in the embodiment is configured such that the twist direction of the assembled article 5 is opposite to the winding direction of the non-woven fabric tape 6. The twist direction of the twisted pair wire 4 is opposite to the twist direction of the assembled article 5 in the embodiment. In other words, in the cable 1, the twist direction of the twisted pair wire 4 and the winding direction of the non-woven fabric tape 6 are the same direction and only the twist direction of the assembled article 5 is opposite to the twist direction of the twisted pair wire 4 and the winding direction of the non-woven fabric tape 6.

The twist direction here is a direction in which the electric wires 2, 3 rotate from the base end toward the front end when the cable 1 is viewed from the front end side (the left side in FIG. 2B, on the side where the non-woven fabric tape 6 overlaps upon itself). In the example, the twist direction of the twisted pair wire 4 is the right rotation (clockwise) and the twist direction of the assembled article 5 is the left rotation (counterclockwise). The twist direction of the twisted pair wire 4 is a direction of twisting two second electric wires 3 together. The twist direction of the assembled article 5 is a direction of twisting two first electric wires 2 and the twisted pair wire 4 together.

The winding direction of the non-woven fabric tape 6 is a direction in which the non-woven fabric tape 6 rotates from the base end toward the front end when the cable 1 is viewed from the front end side (the left side in FIG. 2B, on the side where the non-woven fabric tape 6 overlaps upon itself). In the example, the winding direction of the non-woven fabric tape 6 is the right rotation (clockwise). The cross section as viewed from the front end side is shown in FIG. 2 in which the twist direction of the twisted pair wire 4 is indicated by a dashed arrow A, the twist direction of the assembled article 5 is indicated by a dashed arrow B, and the winding direction of the non-woven fabric tape 6 is indicated by a dashed arrow C.

In general, when twisting electric wires together or spirally winding a tape, a kink is formed according to the twist direction or the winding direction and the entire cable curves spontaneously. In the embodiment, the twist direction of the twisted pair wire 4 is different from the twist direction of the assembled article 5 and also the twist direction of the assembled article 5 is different from the winding direction of the non-woven fabric tape 6. Therefore, the kink of the twisted pair wire 4 and the kink of the assembled article 5 are in the opposite directions and thus cancel out each other, and also, the kink of the assembled article 5 and the kink caused by winding the non-woven fabric tape 6 are in the opposite directions and thus cancel out each other, and it is thereby possible to easily realize a straight cable 1 which is prevented from kinking up. As a result, it is possible to reduce variation in bending properties in the longitudinal direction of the cable 1.

Differing the twist direction of the twisted pair wire 4 from the twist direction of the assembled article 5 allows the assembled article 5 to be formed while controlling change of the twist pitch P1 of the twisted pair wire 4 in twisting the assembled article 5.

Meanwhile, if the twist pitch P1 of the twisted pair wire 4 is large, the twist of the twisted pair wire 4 may loosen when twisting the assembled article 5. Therefore, the twist pitch P1 of the twisted pair wire 4 is desirably smaller than at least the twist pitch P2 of the assembled article 5. In other words, when the twist direction of the twisted pair wire 4 is different from the twist direction of the assembled article 5, adjusting the twist pitch P1 of the twisted pair wire 4 to smaller than the twist pitch P2 of the assembled article 5 allows the twist of the twisted pair wire 4 to be less likely to unravel and it is thereby possible to stabilize the cross sectional shape of the assembled article 5.

In the embodiment, since the kink caused by winding the non-woven fabric tape 6 is used to straighten the kink of the assembled article 5, the winding pitch P3 of the non-woven fabric tape 6 needs to be small enough to cause a kink while maintaining flexibility of the cable 1. Therefore, the winding pitch P3 of the non-woven fabric tape 6 is desirably smaller than at least the twist pitch P2 of the assembled article 5. In the embodiment, the twist pitch P1 of the twisted pair wire 4 is approximately 30 mm, the twist pitch P2 of the assembled article 5 is approximately 60 mm, and the winding pitch P3 of the non-woven fabric tape 6 is approximately 30 mm.

Although the winding pitch P3 of the non-woven fabric tape 6 is the same as the twist pitch P1 of the twisted pair wire 4 in the embodiment, the winding pitch P3 of the non-woven fabric tape 6 only needs to be not less than the twist pitch P1 of the twisted pair wire 4. In such a configuration, it is possible to prevent the non-woven fabric tape 6 or a part of the sheath 7 from entering into a gap between the pair of second electric wires 3 configuring the twisted pair wire 4 by resin pressure in covering the sheath 7, and reduce distortion of the non-woven fabric tape 6 at a portion in contact with the twisted pair wire 4. Therefore, it is easy to form the cable 1 having a circular cross sectional shape. Also, it is effective that reducing the bending resistance of the twisted pair wire 4 can be prevented.

Likewise, since the twist direction of the assembled article 5 is opposite to the winding direction of the non-woven fabric tape 6, the twist pitch P2 of the assembled article 5 is less likely to change when winding the non-woven fabric tape 6 and it is thereby possible to stabilize the twist pitch P2 of the assembled article 5.

Furthermore, reversing the twist direction of the assembled article 5 to the winding direction of the non-woven fabric tape 6 can prevent a part of the non-woven fabric tape 6 or the part of the sheath 7 from entering into the gap between the pair of first electric wires 2 or between the first electric wire 2 and the twisted pair wire 4 by the resin pressure in covering the non-woven fabric tape 6 with the sheath 7. In other words, changing (reducing) the cross sectional shape of the space surrounded by the non-woven fabric tape before or after covering around the non-woven fabric tape 6 with the sheath 7 can be prevented. Thus, air stored in the space surrounded by the non-woven fabric tape 6 can be further prevented from escaping from the gap between the non-woven fabric tape 6 or the overlapped portion of the non-woven fabric tape 6. And the risk of causing the bubbles in the sheath 7 can further decrease. Moreover, twisting the cross sectional shape of the non-woven fabric tape 6 can be controlled. These results allow the non-woven fabric tape 6 and the sheath 7 to be easily stripped and removed in the terminal process of the cable 1. Since the kink is reduced in the cable 1 as described above, the sheath 7 is stripped and removed more easily.

Furthermore, reversing the twist direction of the assembled article 5 and the winding direction of the non-woven fabric tape 6, a direction likely to cause buckling of the assembled article 5 can be different from a direction likely to cause buckling of the non-woven fabric tape 6. Therefore, it is possible to realize the cable 1 which is less likely to buckle even when, e.g., twist and bend are simultaneously applied to the cable 1.

(Description of the Wire Harness Using the Cable 1)

Figure 3:
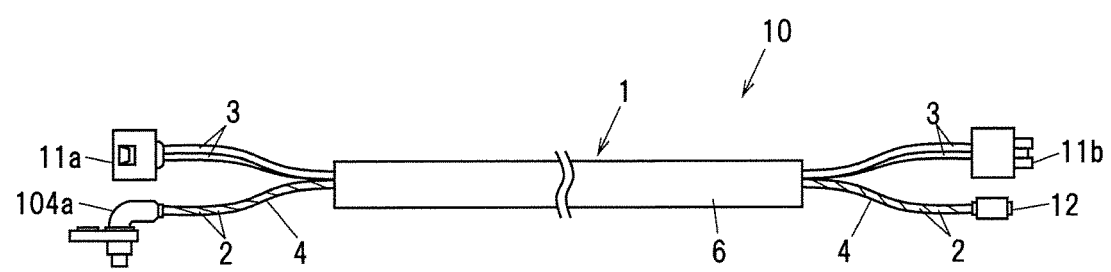
FIG. 3 is a schematic configuration diagram showing a wire harness in an embodiment of the invention.

FIG. 3 is a schematic configuration diagram showing a wire harness in the embodiment.

As shown in FIG. 3, a wire harness 10 is provided with the cable 1 of the embodiment, and a connector attached to at least one of end portions of the first electric wires 2 and of the second electric wires 3.

In FIG. 3, an end portion on the wheel 102 side is shown on the left side and an end portion on the vehicle body 105 side (the junction box 106 side) is shown on the right side. In the following description, an end of the wire harness 10 on the wheel 102 side is referred to "one end" and another end on the vehicle body 105 side (the junction box 106 side) is referred to as "other end".

A wheel-side power connector 11a for connection to the EPB motor 101a is attached to one end of the pair of first electric wires 2, and a vehicle body-side power connector 11b for connection to the wire group 107 inside the junction box 106 is attached to the other end of the pair of first electric wires 2.

The ABS sensor 104a having a body that is the resin molded body formed by resin molding is attached to one end of the pair of second electric wires 3 (the twisted pair wire 4), and a vehicle body-side ABS connector 12 for connection to the wire group 107 inside the junction box 106 is attached to the other end of the pair of second electric wires 3 (the twisted pair wire 4).

Although the separate connectors are provided on the first electric wires 2 and the second electric wires 3 (the twisted pair wire 4) in this example, one dedicated connector may be provided so that both electric wires 2, 3 are connected all together.

Effects of Embodiment

As described above, the non-woven fabric tape 6 of the cable 1 in the embodiment is formed of polyester, polypropylene, aramid fiber, nylon, acryl fiber, or glass fiber. The air permeability of the non-woven fabric tape 6 is not less than 30 $cm^3/cm^2 \cdot sec$.

Using the non-woven fabric tape 6 formed of polyester, polypropylene, aramid fiber, nylon, acryl fiber, or glass fiber can prevent absorbing moisture. Thus, causing void in the sheath 7 by moisture absorbed in the non-woven fabric tape 6 can be prevented.

Also, setting the air permeability of the non-woven fabric tape 6 not less than 30 $cm^3/cm^2 \cdot sec$ allows the non-woven fabric tape 6 to prevent causing the void in the sheath 7 by air stored in the space surrounded by the non-woven fabric tape 6.

Furthermore, the twist direction of the assembled article 5 (the pair of first electric wires 2 and the twisted pair wire 4) is opposite to the winding direction of the non-woven fabric tape 6 in the cable 1 of the embodiment. Thus, changing (reducing) the cross sectional shape of the space surrounded by the non-woven fabric tape 6 can be prevented. Therefore, air stored in the space surrounded by the non-woven fabric tape 6 can be further prevented from escaping from the gap between the non-woven fabric tape 6 or from the overlapped portion of the non-woven fabric tape 6. Therefore, the risk of causing the bubbles in the sheath 7 can further decrease.

The winding pitch P3 of the non-woven fabric tape 6 is set not less than the twist pitch P1 of the twisted pair wire 4. In such a configuration, it is possible to decrease entering the non-woven fabric tape 6 or the part of the sheath 7 into the gap between the pair of second electric wires 3 configuring the twisted pair wire 4 by resin pressure in covering with the sheath 7, and changing (reducing) the cross sectional shape of the space surrounded by the non-woven fabric tape can be further prevented.

(Modification)

(1) Although the assembled article 5 is formed by using the pair of (two) first electric wires 2 and the twisted pair wire 4 in the embodiment, the assembled article 5 may not be provided with the twisted pair wire 4, or may twist two or more than three first electric wires 2 having approximately same outer diameter.

(2) An inside sheath covering the twisted pair wire 4 together may be formed around the twisted pair wire 4. In such a configuration, the assembled article 5 is formed by twisting the pair of first electric wires 2 and the twisted pair wire 4 covered by the inside sheath.

(3) Although the twist direction of the twisted pair wire 4 is opposite to the twist direction of the assembled article 5 in the embodiment, the twist direction of the twisted pair wire 4 may be the same direction with the twist direction of the assembled article 5 in the embodiment. In such a configuration, according as the twist of the assembled article 5 is opened (wound down), the twist of the twisted pair wire 4 is also opened in twisting the cable 1. And according as the twist of the assembled article 5 is closed (wound up), the twist of the twisted pair wire 4 is also closed. Thus, the load applied to the first electric wire 2 and the twisted pair wire 4 each other by twisting the cable 1 can decrease. And the resistance in twisting can increase.

(4) Although the sheath 7 is formed by a single layer in the embodiment, the sheath 7 may be formed by at least two or more layers. In such a configuration, the outermost layer can be formed as a flame resisting layer formed by adding the flame retardant in the resin.

Summary of Embodiments

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A cable (1), comprising:
an assembled article (5) formed by twisting a plurality of electric wires (2, 3);
a tape member spirally wound around the assembled article (5); and
a sheath (7) covering around the tape member, the sheath comprising is an injection molded body comprising an urethane resin,
wherein the tape member comprises a non-woven fabric tape (6) comprising a polyester, a polypropylene, an aramid fiber, a nylon, an acryl fiber, or a glass fiber and an air permeability defined by the Frazier method of not less than 30 cm$^3$/cm$^2$·sec, and
wherein a twist direction of the assembled article (5) is opposite to a winding direction of the non-woven fabric tape (6).

[2] The cable (1) according to [1], wherein the assembled article (5) is formed by twisting a pair of first electric wires (2) and a twisted pair wire (4) formed by twisting a pair of second electric wires (3) whose outer diameter is shorter than an outer diameter of the first electric wire (2), and wherein a twist direction of the twisted pair wire (4) is opposite to the twist direction of the assembled article (5), and the twist direction of the twisted pair wire (4) is a same direction as the winding direction of the non-woven fabric tape (6).

[3] The cable (1) according to [1], wherein the assembled article (5) is formed by twisting a pair of first electric wires (2) and a twisted pair wire (4) formed by twisting a pair of second electric wires (3) whose outer diameter is shorter than an outer diameter of the first electric wire (2), and
wherein a twist direction of the twisted pair wire (4) is a same direction as the twist direction of the assembled article (5), and the twist direction of the twisted pair wire (4) is opposite to the winding direction of the non-woven fabric tape (6).

[4] The cable (1) according to anyone of [1] to [3], wherein the air permeability of the non-woven fabric tape (6) defined by the Frazier method is not more than 200 cm$^3$/cm$^2$·sec.

[5] The cable (1) according to [4], wherein the air permeability of the non-woven fabric tape (6) defined by the Frazier method is not less than 40 cm$^3$/cm$^2$·sec and not more than 200 cm$^3$/cm$^2$·sec.

[6] The cable (1) according to anyone of [1] to [5], wherein an outer diameter of the assembled article (5) is not less than 5 mm and not more than 9 mm, and wherein a width of the non-woven fabric tape (6) is not less than 20 mm and not more than 50 mm.

[7] A wire harness (10), comprising:
a cable (1) according to anyone of [1] to [6]; and
a connector (11*a*, 11*b*) arranged at an end of the electric wire.

What is claimed is:

1. A cable, comprising:
an assembled article formed by twisting a plurality of electric wires;
a tape member spirally wound around the assembled article; and
a sheath covering around the tape member, the sheath comprising an injection molded body comprising an urethane resin, wherein the tape member comprises a non-woven fabric tape comprising a polyester, a polypropylene, an aramid fiber, a nylon, an acryl fiber, or a glass fiber and an air permeability at a pressure differential of 125 Pa of not less than 30 cm.$^3$/cm.$^2$ sec, and
wherein a twist direction of the assembled article is opposite to a winding direction of the non-woven fabric tape,
wherein an outer diameter of the assembled article is not less than 5 mm and not more than 9 mm, and wherein a width of the non-woven fabric tape is not less than 20 mm and not more than 50 mm.

2. The cable according to claim 1, wherein the assembled article is formed by twisting a pair of first electric wires and a twisted pair wire formed by twisting a pair of second electric wires whose outer diameter is shorter than an outer diameter of the first electric wire, and wherein a twist direction of the twisted pair wire is opposite to the twist direction of the assembled article, and wherein the twist direction of the twisted pair wire is a same direction as the winding direction of the non-woven fabric tape.

3. The cable according to claim 2, wherein the air permeability of the non-woven fabric tape is not more than 200 cm.$^3$/cm.$^2$ sec.

4. The cable according to claim 2, wherein the air permeability of the non-woven fabric tape is not less than 40 cm.$^3$/cm.$^2$ sec and not more than 200 cm.$^3$/cm.$^2$ sec.

5. The cable according to claim 1, wherein the assembled article is formed by twisting a pair of first electric wires and a twisted pair wire formed by twisting a pair of second electric wires whose outer diameter is shorter than an outer diameter of the first electric wire, and wherein a twist direction of the twisted pair wire is a same direction as the twist direction of the assembled article, and wherein the twist direction of the twisted pair wire is opposite to the winding direction of the non-woven fabric tape.

6. The cable according to claim 5, wherein the air permeability of the non-woven fabric tape is not more than 200 cm.$^3$/cm.$^2$ sec.

7. The cable according to claim 5, wherein the air permeability of the non-woven fabric tape is not less than 40 cm.$^3$/cm.$^2$ sec and not more than 200 cm.$^3$/cm.$^2$ sec.

8. The cable according to claim 1, wherein the air permeability of the non-woven fabric tape is not more than 200 cm.$^3$/cm.$^2$ sec.

9. The cable according to claim 1, wherein the air permeability of the non-woven fabric tape is not less than 40 cm.$^3$/cm.$^2$ and not more than 200 cm.$^3$/cm.$^2$ sec.

10. A wire harness, comprising: a cable according to claim 1; and a connector arranged at an end of the electric wire.

11. A cable, comprising:
an assembled article formed by twisting a plurality of electric wires;

a tape member spirally wound around the assembled article; and a sheath covering around the tape member, the sheath comprising an injection molded body comprising an urethane resin, wherein the tape member comprises a non-woven fabric tape comprising a polyester, a polypropylene, an aramid fiber, a nylon, an acryl fiber, or a glass fiber and an air permeability at a pressure differential of 125 Pa of not less than 30 cm.$^3$/cm.$^2$ sec, and wherein a twist direction of the assembled article is opposite to a winding direction of the non-woven fabric tape, wherein a width of the non-woven fabric tape is not less than 20 mm and not more than 50 mm.

* * * * *